United States Patent
Burke et al.

(10) Patent No.: US 11,251,737 B2
(45) Date of Patent: Feb. 15, 2022

(54) CONTROL DEVICE

(71) Applicant: PROTEAN ELECTRIC LIMITED, Farnham (GB)

(72) Inventors: Richard Burke, Farnham (GB); Christopher Hilton, Farnham (GB)

(73) Assignee: PROTEAN ELECTRIC LIMITED, Farnham (GB)

( * ) Notice: Subject to any disclaimer, the term of this patent is extended or adjusted under 35 U.S.C. 154(b) by 96 days.

(21) Appl. No.: 16/762,292

(22) PCT Filed: Nov. 9, 2018

(86) PCT No.: PCT/IB2018/058837
§ 371 (c)(1),
(2) Date: May 7, 2020

(87) PCT Pub. No.: WO2019/092657
PCT Pub. Date: May 16, 2019

(65) Prior Publication Data
US 2020/0287495 A1    Sep. 10, 2020

(30) Foreign Application Priority Data
Nov. 10, 2017   (GB) ...................................... 1718609

(51) Int. Cl.
*G05B 11/28* (2006.01)
*H02P 27/08* (2006.01)
(Continued)

(52) U.S. Cl.
CPC ............... *H02P 27/08* (2013.01); *H02K 3/28* (2013.01); *H02K 11/33* (2016.01); *H02P 21/18* (2016.02); *H02P 21/22* (2016.02); *H02P 25/22* (2013.01)

(58) Field of Classification Search
CPC .......... H02P 27/08; H02P 21/18; H02P 21/22; H02K 3/28
(Continued)

(56) References Cited

U.S. PATENT DOCUMENTS

| | | | |
|---|---|---|---|
| 7,250,734 B1 * | 7/2007 | Iannello | H02K 19/103 310/168 |
| 9,979,340 B2 * | 5/2018 | Suzuki | H02P 21/05 |

(Continued)

FOREIGN PATENT DOCUMENTS

| | | |
|---|---|---|
| DE | 112016006447 A1 | 11/2018 |
| EP | 3109999 A2 | 12/2016 |

(Continued)

OTHER PUBLICATIONS

PCT Notification of Transmittal of International Search Report and The Written Opinion of the International Searching Authority dated Jan. 28, 2019, issued from the International Searching Authority in related PCT Application No. PCT/IB2018/058837 (9 pages).

(Continued)

*Primary Examiner* — Erick D Glass
(74) *Attorney, Agent, or Firm* — Nolte Lackenbach Siegel

(57) ABSTRACT

A control device for an electric motor having a first set of coil windings arranged to form a first sub motor and a second set of coil windings arranged to form a second sub motor, wherein current flow in the first set of coil windings is controlled using a first pulse width modulation, PWM, having a first switching sequence and current flow in the second set of coil windings is controlled using a second PWM having a second switching sequence, the control device comprising means arranged to measure the current flow in each of the first set of coil windings, wherein upon determining that the sum of the current flow in the first set of coil windings is substantially non zero, deriving the first (Continued)

PWM values from voltage values used to generate the second PWM.

18 Claims, 7 Drawing Sheets

(51) Int. Cl.
    *H02K 11/33*     (2016.01)
    *H02P 21/18*     (2016.01)
    *H02P 21/22*     (2016.01)
    *H02K 3/28*     (2006.01)
    *H02P 25/22*     (2006.01)

(58) Field of Classification Search
    USPC ......................................................... 318/599
    See application file for complete search history.

(56) References Cited

U.S. PATENT DOCUMENTS

| 10,379,284 B2 * | 8/2019 | Koizumi | H04N 9/3158 |
| 2016/0049894 A1 | 2/2016 | Burke | |

FOREIGN PATENT DOCUMENTS

| EP | 3223422 A1 | 9/2017 |
| GB | 2472297 A | 2/2011 |
| JP | 2011015587 A | 1/2011 |
| WO | 2017141513 A1 | 8/2017 |

OTHER PUBLICATIONS

GB Search Report dated Dec. 6, 2017, issued from the GB Intellectual Property Office in related GB Application No. GB1718609.9. (1 page).

* cited by examiner

CONTROL DEVICE

CROSS REFERENCE TO RELATED APPLICATION

This application is a U.S. National Stage Patent Application based on PCT No. PCT/IB2018/058837 filed Nov. 9, 2018, claiming priority to GB Application No. 1718609.9, filed on Nov. 10, 2017, the entire contents of which are hereby incorporated by reference as though fully set forth herein.

The present invention relates to a control device, in particular a current determining device for an electric motor.

Electric motor systems typically include an electric motor and a control unit arranged to control the power/torque generated by the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

Typically, the three phase bridge inverter will generate a three phase voltage supply using a form of pulse width modulation (PWM) voltage control, where a three phase bridge inverter uses a number of switching devices, for example power electronic switches such as Insulated Gate Bipolar Transistor (IGBT) switches to generate the PWM voltage. PWM control works by using the motor inductance to average out an applied pulse voltage to drive the required current into the motor coils. Using PWM control an applied voltage is switched across the motor coils. During this on period, the current rises in the motor coils at a rate dictated by its inductance and the applied voltage. The PWM control is then required to switch off before the current has changed too much so that precise control of the current is achieved.

To ensure that the current flow in the respective coil windings is correctly regulated, typically the current flow in one or more of the coil windings is measured using a current sensor.

For an electric motor having coil windings configured in a wye configuration, one mechanism for checking the accuracy of current sensor readings for the electric motor makes use of Kirchhoff's first law, where the sum of the current at the node is zero. The node in a wye configuration is typically called a star point. Accordingly, if the sum of the current sensor readings for the current flowing in the coil windings of a multi phase electric motor placed in a star or wye configuration is substantially zero, a determination can be made that each of the current measurements are correct. If, however, the measured sum of the current is not zero it can be concluded that at least one of the current sensors is not operating correctly. However, knowledge that the sum of the measured current flow is non zero does not in itself allow a determination to be made as to which current sensor reading is incorrect.

It is desirable to improve this situation.

In accordance with an aspect of the present invention there is provided a control device and method according to the accompanying claims.

The invention as claimed has the advantage of allowing a faulty electric motor current sensor reading to be identified and isolated, thereby allowing correct current sensor readings to be used to regulate current flow within the electric motor.

The present invention will now be described, by way of example, with reference to the accompanying drawings, in which.

The embodiment of the invention described is for a control device for an electric motor, where the electric motor is for use in a wheel of a vehicle. However the electric motor may be used for any purpose and when located in a vehicle may be located anywhere within the vehicle. The motor is of the type having a set of coils being part of the stator for attachment to a vehicle, radially surrounded by a rotor carrying a set of magnets for attachment to a wheel. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
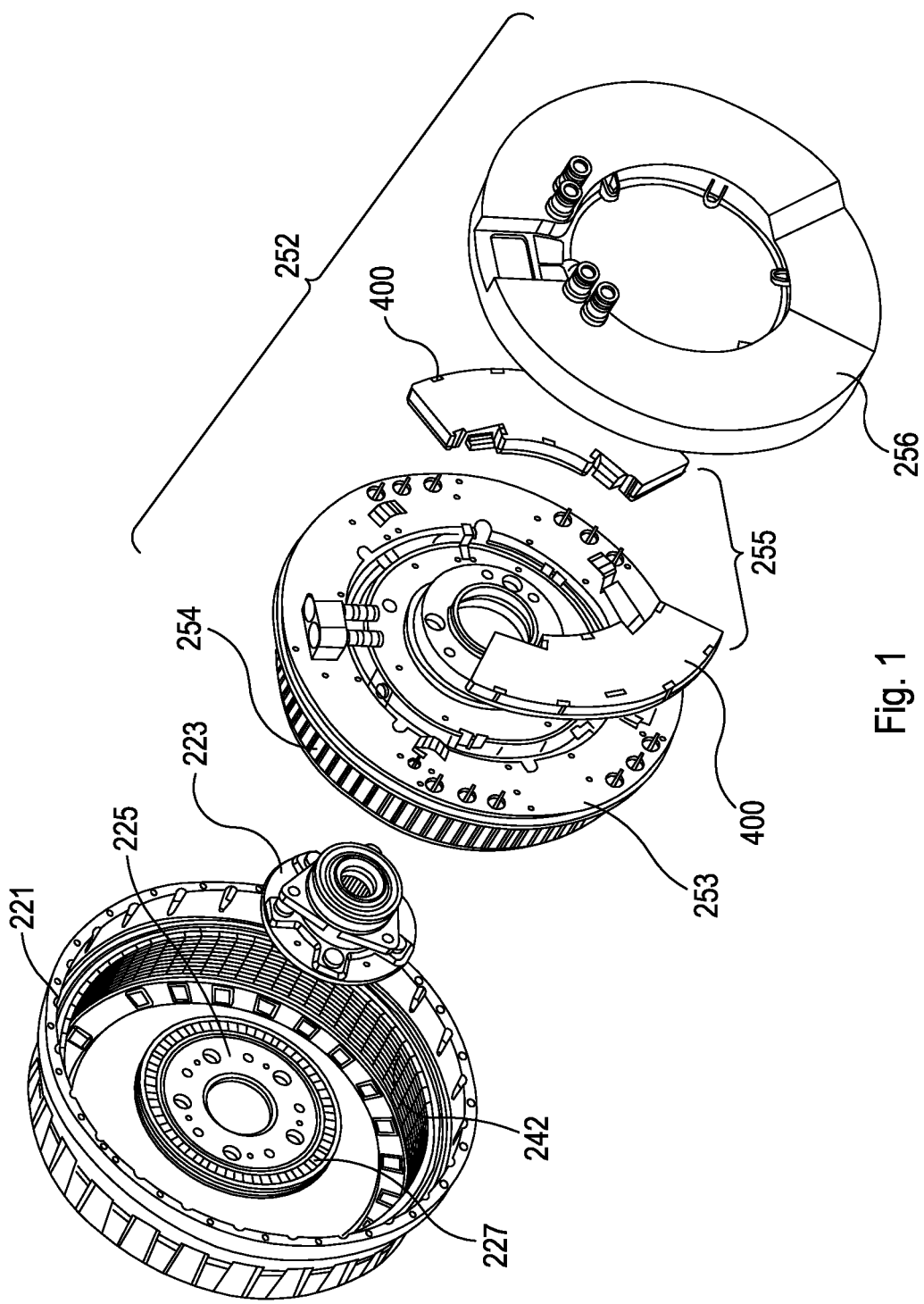
FIG. 1 illustrates an exploded view of an electric motor as used in an embodiment of the present invention.

For the purposes of the present embodiment, as illustrated in FIG. 1, the in-wheel electric motor includes a stator 252 comprising a heat sink 253, multiple coils 254 and an electronics module 255 mounted in a rear portion of the stator for driving the coils. The coils 254 are formed on stator tooth laminations to form coil windings, as described below. A stator cover 256 is mounted on the rear portion of the stator 252, enclosing the electronics module 255 to form the stator 252, which may then be fixed to a vehicle and does not rotate relative to the vehicle during use.

Figure 3:
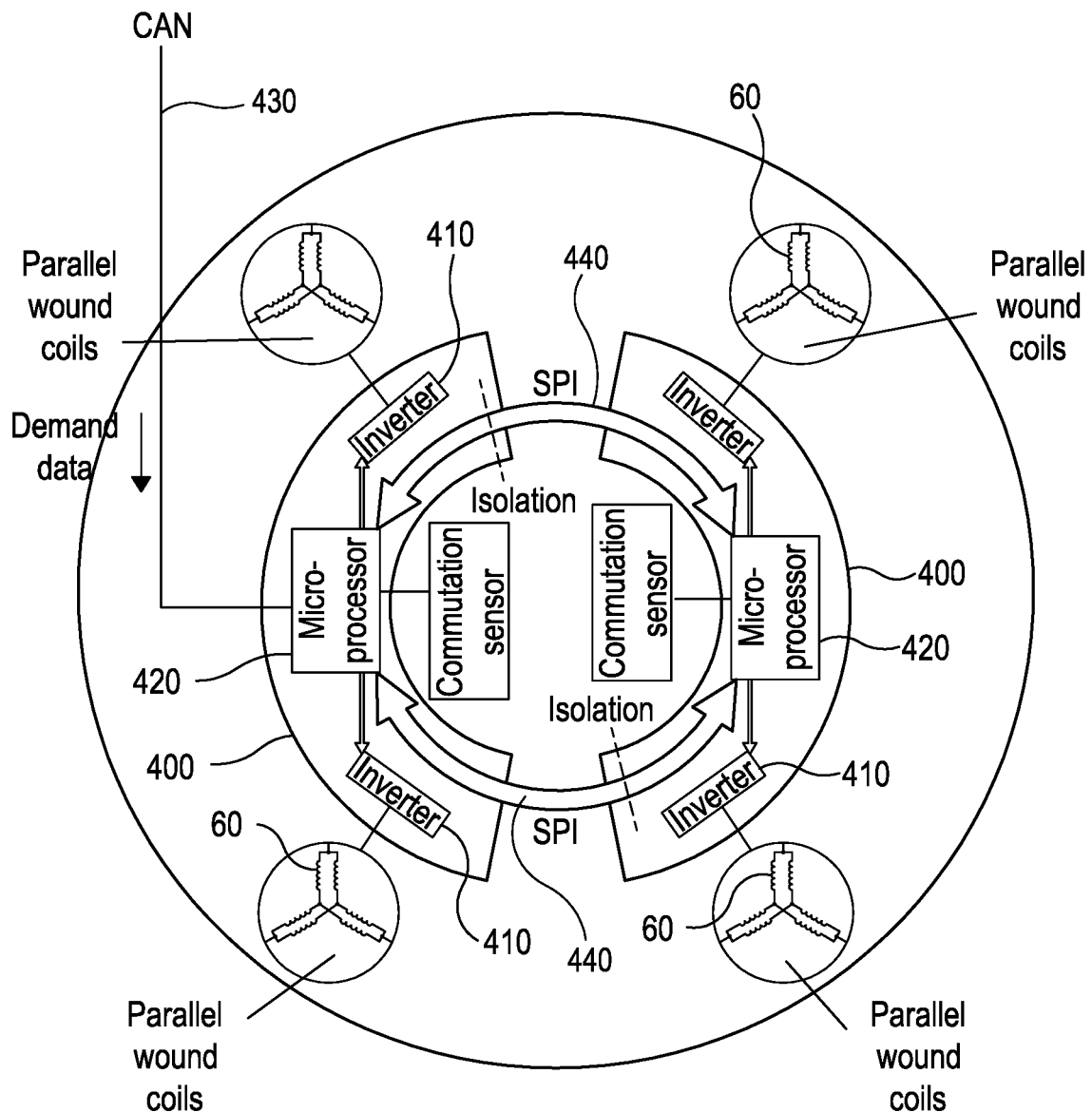
FIG. 3 illustrates an electric motor according to an embodiment of the present invention.

The electronics module 255 includes two control devices 400, where each control device 400 includes two inverters 410 and control logic 420, which in the present embodiment includes a processor, for controlling the operation of both inverters 410, as illustrated in FIG. 3. Although in the present embodiment the electronics module 255 includes two control devices, equally the electronics module 255 may include a single control device or more than two control devices.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 2:
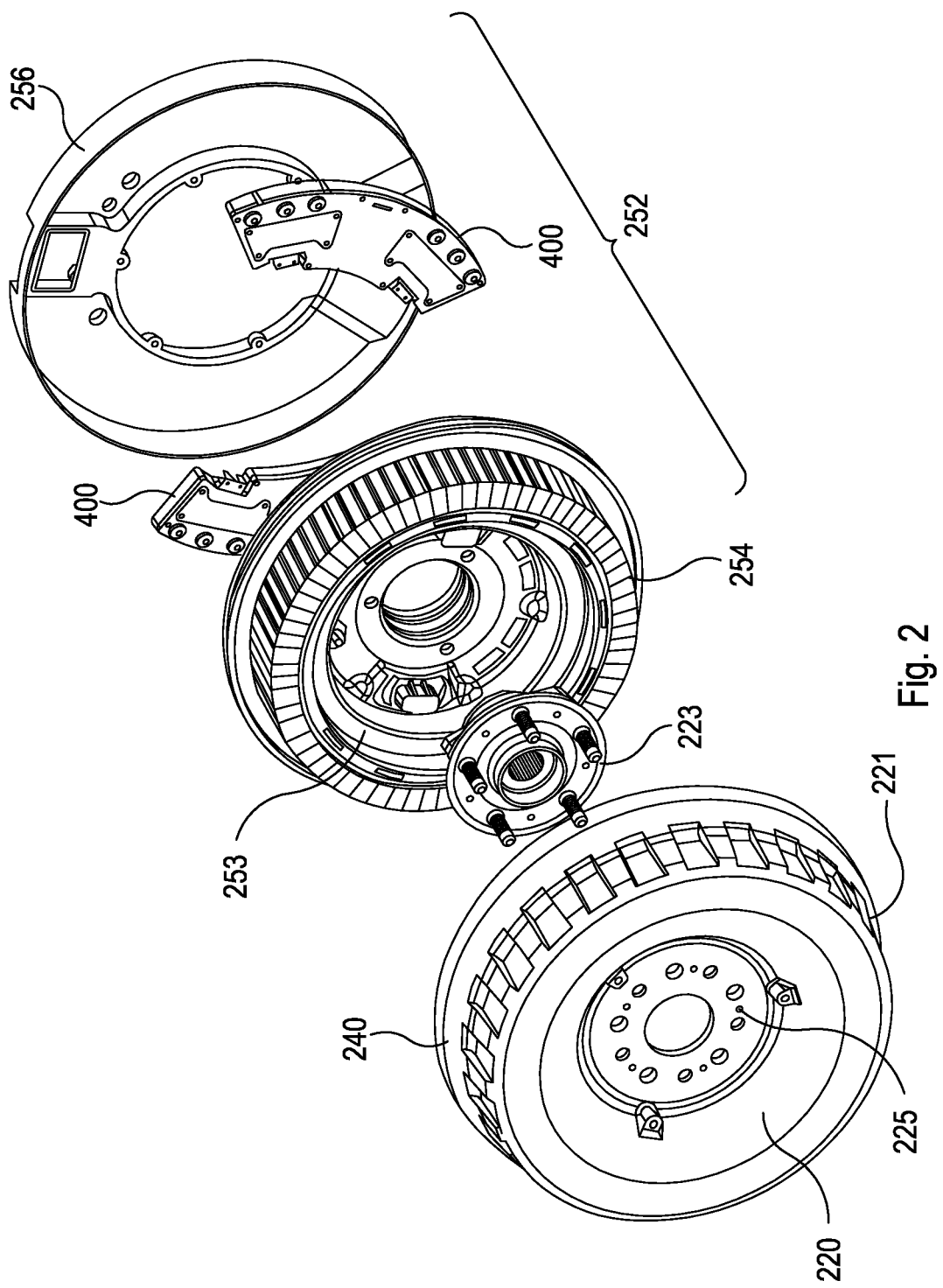
FIG. 2 illustrates an exploded view of the electric motor shown in FIG. 1 from an alternative angle.

FIG. 2 shows an exploded view of the same assembly as FIG. 1 from the opposite side showing the stator 252 and rotor. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improve position detection, preferably the sensor include an associated second sensor placed 90 electrical degrees displaced from the first sensor.

The motor 40 in this embodiment includes four coil sets 60 with each coil set 60 having three coil sub-sets that are coupled in a wye configuration to form a three phase sub-motor, resulting in the motor having four three phase sub-motors. A first control device is coupled to two coil sets with a second control device being coupled to the other coil sets, where each inverter in the respective control devices is arranged to control current in a respective coil set. However, although the present embodiment describes an electric motor having four coil sets 60 (i.e. four sub motors) the motor may equally have two or more coil sets with associated control devices (i.e. two or more sub motors). For example in a preferred embodiment the motor 40 includes eight coil sets 60 with each coil set 60 having three coil sub-sets that are coupled in a wye configuration to form a three phase sub-motor, resulting in the motor having eight three phase sub-motors.

FIG. 3 illustrates the connections between the respective coil sets 60 and the control devices 400 housed in the electronics module 255, where a respective coil set 60 is connected to a respective three phase inverter 410 included on a control device 400. As is well known to a person skilled in the art, a three phase inverter contains six switches, where a three phase alternating voltage may be generated by the controlled operation of the six switches.

As stated above, the electronics module 255 includes two control devices 400, with each control device 400 having two inverters 410 that are coupled to a coil set 60.

Additionally, each control device 400 includes an interface arrangement, where in a first embodiment the interface arrangement on each control device 400 is arranged to allow communication between the respective control devices 400 housed in the electronics module 255 via a communication bus with one control device 400 being arranged to communicate with a vehicle controller mounted external to the electric motor. The processor 420 on each control device 400 is arranged to handle communication over the interface arrangement.

The processors 420 on the respective control devices 400 are arranged to control both inverters 410 mounted in the respective control device 400 to allow each of the electric motor coil sets 60 to be supplied with a three phase voltage supply, thereby allowing the respective coil sub-sets to generate a rotating magnetic field. Although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide PWM voltage control across the respective coil sub-sets, thereby generating a current flow in the respective coil sub-sets for providing a required torque by the respective sub-motors.

As stated above, PWM switching is used to apply an alternating voltage to the electric motors coil windings, where the amplitude of the voltage applied across the coil windings is dependent upon the rotor speed. The torque applied to the rotor results from phase current within the coil windings, where motor torque is a function of the amplitude of the phase current and the phase angle. In other words for a three phase motor:

$$T=f(I_u, I_v, I_w, \theta)$$

As stated above, PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit.

Figure 4:
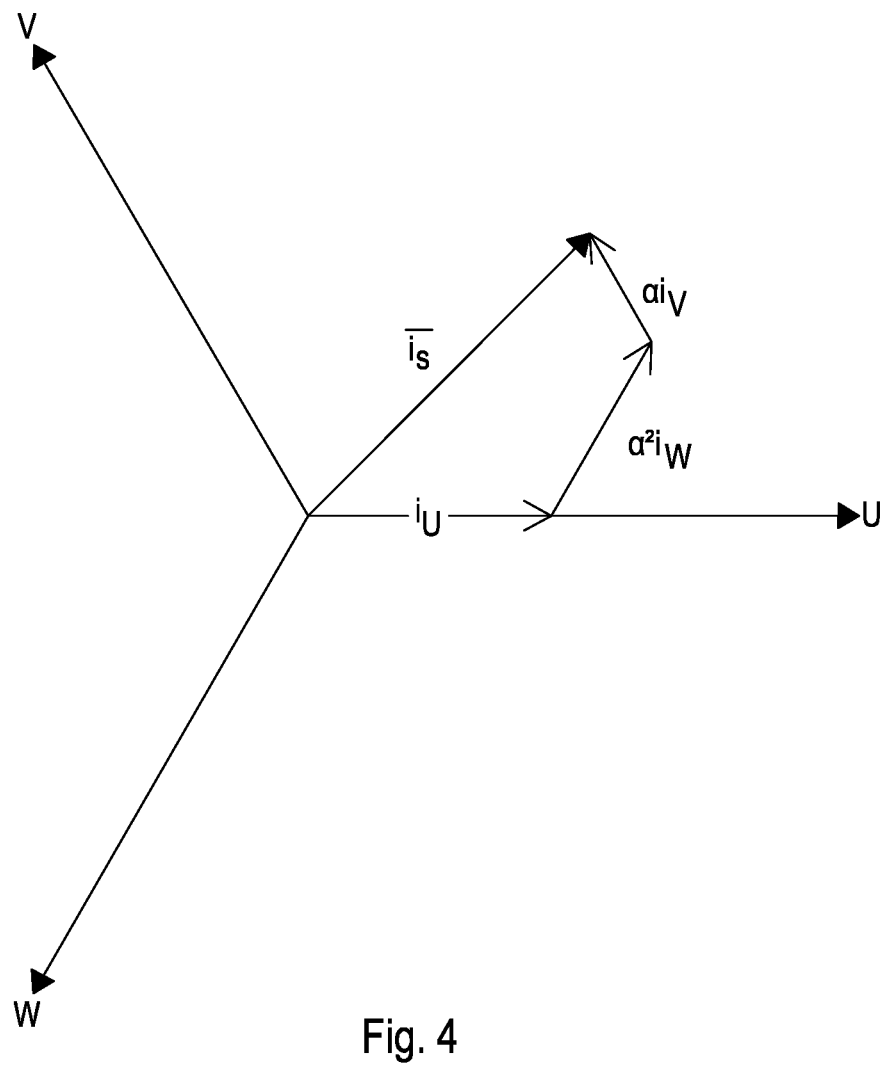
FIG. 4 illustrates current phase angle for an electric motor according to an embodiment of the present invention.

The phase angle of the resulting current flow in each coil sub-set is separated by 120 degrees, as represented in FIG. 4 by the three axis a, b, c, where as stated above the voltage envelope and phase angle of the electrical signals is determined by the modulating voltage pulses.

Figure 5A:
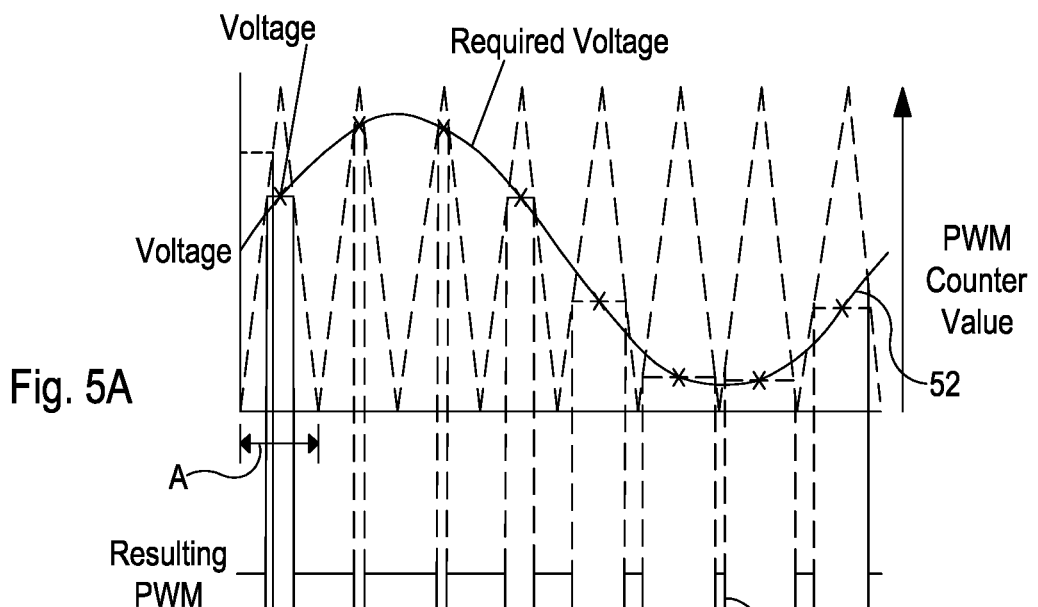
FIG. 5a illustrates PWM voltage control for a single voltage phase.

An illustration of PWM voltage control for a single voltage phase in an electric motor is illustrated in FIG. 5a, where the modulated PWM pulses 51 result in a sine like voltage being formed across coil windings of an electric motor to form a voltage envelope 52 with a given phase angle. The smoothness of the resultant waveform can be controlled by varying the width and number of modulation pulses. The PWM modulation period is illustrated in FIG. 5a by the time period A.

The sinusoidal voltage waveforms generated by the control devices 64 are determined using a Space Vector modulation technique known as Field Orientation Control, where the rotor flux and stator currents are represented by respective vectors.

For the purposes of the present embodiment, the PWM voltage control is arranged to have a modulation period of 62.4 µsec, which provides a PWM modulation rate of approximately 16 kHz. However, any suitable PWM modulation rate may be used.

In a preferred embodiment, to control the timing of the PWM modulation rate, the processors 420 on each of the control devices 400 include a PWM counter. The PWM counters are arranged to cycle through a count range of 0 to n, where n can be of any value, however, for the purposes of the present embodiment the value of n is 1247. The time taken to cycle from 0 to 1247 takes approximately 62.5 µsec, which corresponds to the PWM modulation period for the present embodiment. A PWM pulse is switched on and off at specified count values based upon the PWM duty cycle.

For example, if the PWM duty cycle is 50 percent a PWM pulse would be switched on at a count value of 312 and switched off at a count value of 935. That is to say, the PWM pulse is switched on for 50 percent of the PWM modulation period.

As described above, the voltage modulation depth of a series of PWM pulses determines the voltage phase angle and voltage envelope formed across the respective electric motor coils.

Although the present embodiment utilizes a PWM counter to control the PWM modulation period, as would be appreciated by a person skilled in the art, other techniques for controlling the PWM modulation period may be used. If a PWM counter is used to control the PWM modulation period any suitable count range may be used.

As described above, the plurality of switches are configured to form a three phase bridge circuit. As is well known to a person skilled in the art, the number of switches will depend upon the number of voltage phases to be applied to the respective sub motors. Although the current design shows each sub motor having a three phase construction, the sub motors can be constructed to have any number of phases.

To minimize DC link capacitance and electromagnetic noise the PWM voltage signals generated by each sub motor coupled to a respective inverter within a control device, which are arranged to provide electrical signals having a voltage envelope with substantially the same phase angle, are arranged to be offset with respect to each other. That is to say, even though the voltage envelope for a particular voltage phase generated by different sub motors will have substantially the same phase angle, the PWM pulses used to generate these voltage signals are offset with respect to each other.

Figure 5B:
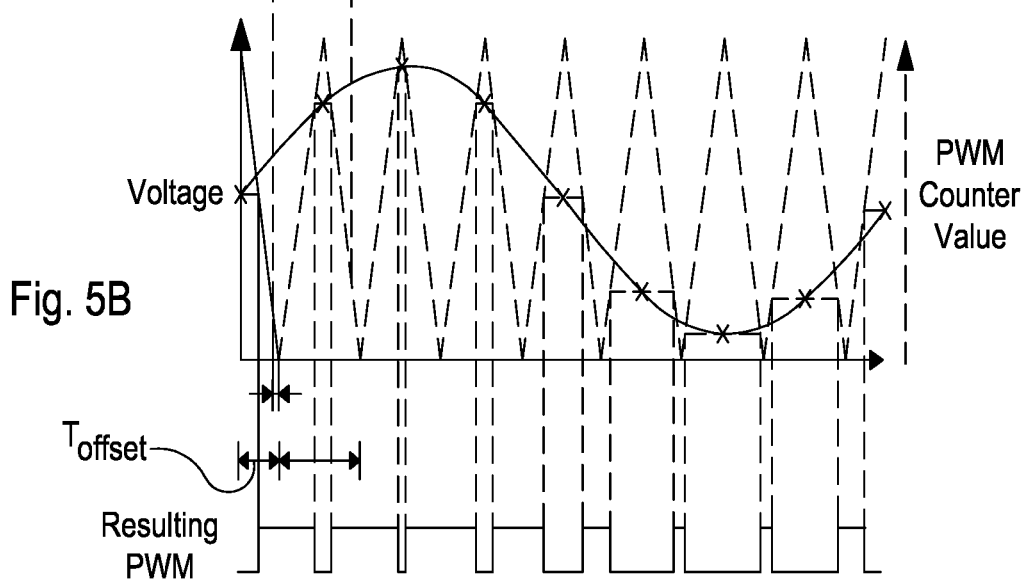
FIG. 5b illustrates phase shifted PWM voltage control for a single voltage phase relative to that illustrated in FIG. 5a in an electric motor according to an embodiment of the present invention.

For example, in a preferred embodiment, where each control device within an electric motor is arranged to drive two three phase sub motors the PWM switching sequence for one sub motor may be staggered by half the PWM period (e.g. the PWM switching sequence of one sub motor is staggered by 31.2 µsec relative to the PWM switching sequence of the other sub motor, as illustrated in FIG. 5b).

For an electric motor where each control device is arranged to drive more than two sub motors, preferably the PWM switching sequence for each sub motor is staggered relative to each other by an amount based on the number of sub motors, however the switching sequence of each sub motor can be staggered relative to each other based on any criteria. Similarly, the PWM for the inverters on the one control device is preferably also staggered with respect to the inverter PWM signals on the other control device.

As illustrated in FIG. 5b, to achieve a PWM offset between different sub-motors the count values between the respective PWM counters are arranged to be offset with respect to each other. $T_{offset}$ in FIG. 5b illustrates the PWM offset relative to the PWM voltage signals in FIG. 5a. That is to say, in FIG. 5a counter value 0 corresponds to T=0, whereas in FIG. 5b counter value 0 corresponds to $T=T_{offset}$. By offsetting the PWM counter values, the corresponding PWM signals generated by the respective inverters for electrical signals having a voltage envelope with substantially the same phase angle across the different sub motors are generated using the same PWM counter values, with the relative counter offset causing the PWM signals to be offset. This is illustrated in FIG. 5a and FIG. 5b, where the voltage envelope illustrated in FIGS. 5a and 5b have substantially the same phase and amplitude but are generated with offset PWM voltage signals.

This has the effect of phase shifting the respective PWM voltage pulses generated by each inverter on the respective sub motors. Accordingly, even though the voltage envelope for different voltage signals generated by the inverters will have substantially the same phase angle, the PWM signals used to generate these voltage signals will be offset from each other by some proportion of one PWM cycle (for example, the waveforms in FIGS. 5A and 5B are staggered by 50% of a PWM cycle), thereby helping to minimize DC link capacitance and electromagnetic noise.

Preferably a synchronization signal is used to maintain synchronization between the PWM counters on the different sub motors.

In the present embodiment, one of the control devices 400 included in the electronics module 255, designated the master control device, or first control device, is arranged to receive torque demand requests over a communication line from an external vehicle controller. The torque demand requests received at the master control device 400 is transmitted by the master control device 400 to the other control device 400 housed in the electronics module 255, designated the second control device, over a different communication bus, which in the present embodiment is a serial peripheral interface SPI bus. Optionally, status information may also be provided from the control devices 400 to the external vehicle controller.

To allow the master control device 400 to communicate with an external vehicle controller, the interface arrangement for the master control device 400 includes a controller area network CAN interface for allowing the master control device 400 to communicate with the external vehicle controller over a CAN bus 430.

To allow the master control device 400 and the second control device 400 to communicate over an SPI bus the interface arrangement for both control devices 400 housed within the electronics module 255 includes an SPI device for allowing communication between both electronics module control devices over the SPI buses 440.

Although the present embodiment describes the use of a CAN bus for communicating between a control device 400 and an external vehicle controller and an SPI bus for communicating between two control devices 400 housed within an electronics module, other types of communications may be used to convey torque information.

Preferably, the vehicle controller is arranged to transmit a torque demand request to the master control device 400 over the CAN bus 430. The torque demand request transmitted over the CAN bus 430 corresponds to the total torque that the electric motor is required to generate based upon a drivers input, for example based on a throttle demand generated within the vehicle.

Other data may also be communicated over the CAN bus 430.

The master control device 400 is arranged to read an enable signal and total torque demand request communicated over the CAN bus 430. The master control device 400 is arranged to communicate the data received over the CAN bus, that is to say the total torque demand request, over the SPI bus 440 to the second control device 400.

Although the present embodiment describes an electric motor having an electronic module that includes two control devices, with each control device is arranged to drive two coil sets using a processor to control the operation of two inverters, as stated above the electronic module may have two or more control devices where each control device is arranged to include two or more inverters for driving one or more coil sets. However, in a preferred embodiment the electronic module for an electric motor includes two control devices where each control device includes a single processor arranged to control the operation of two inverters, where each inverter is coupled to two coil sets connected in parallel with the star points of the respective parallel coil sets being electrically isolated.

As stated above, the determination of the respective sinusoidal waveforms generated by the control devices 64 are determined using Field Orientation Control.

As illustrated in FIG. 4, currents U, V, W represent the instantaneous current in the respective stator coils in the a, b, and c axis of a three phase current reference frame, where the stator current vector is defined by $i_s = i_U + \alpha i_V + \alpha^2 i_W$, where $\alpha = e(i*2*\pi/3)$.

Field Oriented Control is based on projections that transform a three phase time and speed dependent system into a two co-ordinate time invariant system, where a stator current component is aligned with a quadrature axis q and a magnetic flux component is aligned with a direct axis d.

Field Orientated Control algorithms utilize Clarke and Park transforms to transform the three phase voltage and current of a three phase motor into a two dimension co-ordinate system.

The Clarke transforms use the three phase current U, V, and W to calculate currents in the two phase orthogonal stator axes i$\alpha$ and i$\beta$. A Park transformation is then used to transform the two fixed co-ordinate stator axes i$\alpha$ and i$\beta$ to a two co-ordinate time invariant system id and iq, which defines a d, q rotating reference frame.

Under normal drive conditions the rotor phase angle $\theta r$, which is defined by the rotor magnetic flux vector $\Psi R$, and the stator electrical phase angle $\theta e$ are aligned with the d-axis, thereby maintaining synchronization between the rotor phase angle $\theta r$ and the stator electrical phase angle $\theta e$. For the purposes of the present embodiment, the rotor phase angle $\theta r$ is measured using the rotor commutation magnets and position sensors mounted on the control devices 80, as is well known to a person skilled in the art.

Current in the quadrature (q) axis results in motor torque, current in the direct (d) axis results in a magnetic field variation of the rotor magnets.

Figure 6:
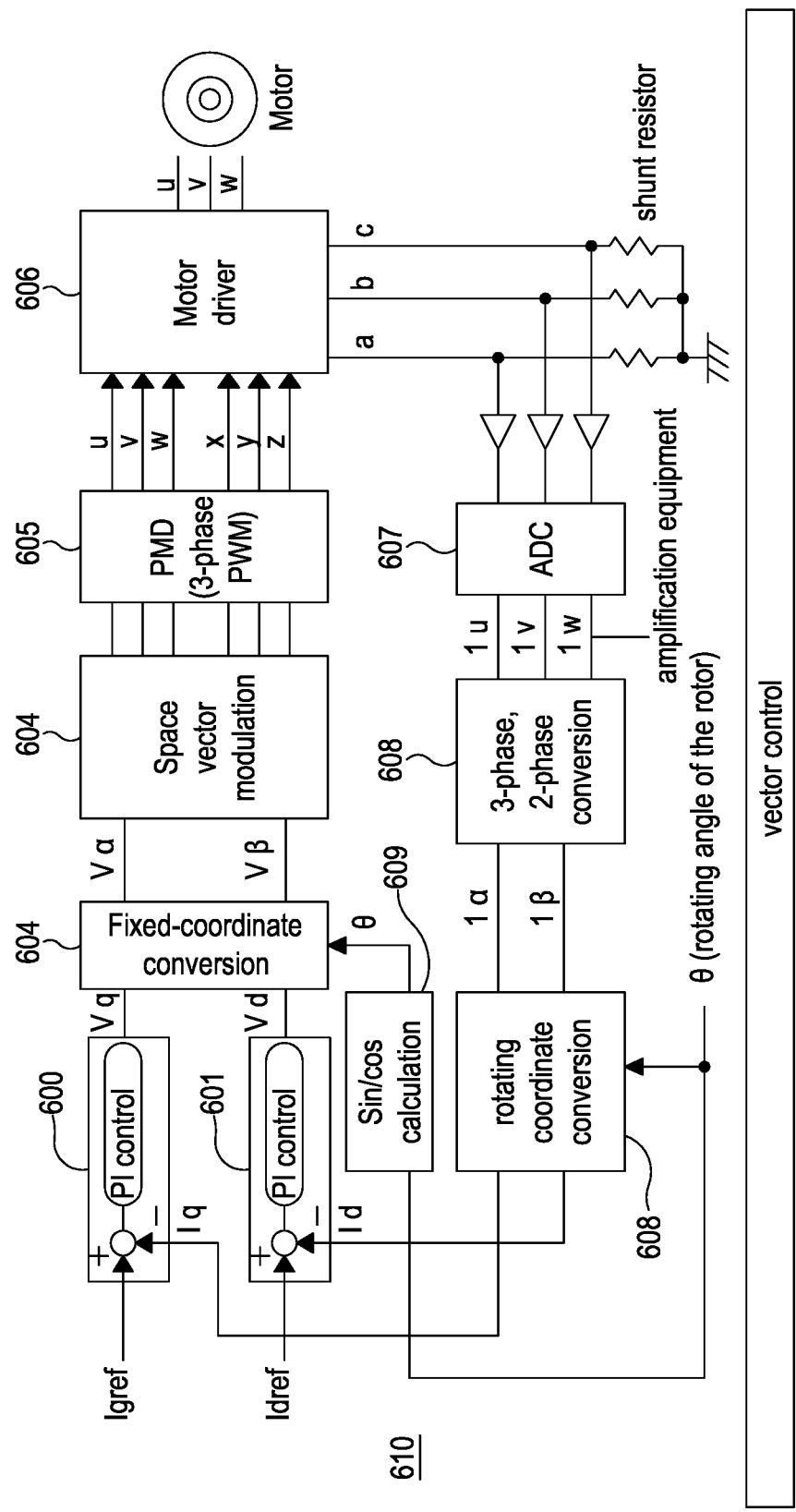
FIG. 6 illustrates a space vector controller.

FIG. 6 illustrates an example of various functional blocks used within a space vector controller 610, which includes a first PI control 600 for receiving an Iq reference current and a second PI control 601 for receiving an Id reference current that generate a voltage value in the quadrature axis Vq and a voltage value in the direct axis Vd respectively, a fixed coordinate conversion module 603, a space vector modulation module 604, a PWM module 605, a motor driver module 606, an analogue to digital converter ADC 607, a three phase to two phase conversion module 608, a rotating coordinate conversion module 609 and a sin/cos calculation module 610, as is well known to a person skilled in the art. Typically the functional blocks of the space vector controller are implemented by the processors within the respective control devices.

As is well known to a person skilled in the art, the fixed coordinate conversion module 603 converts the Vq and Vd voltage values into a two phase orthogonal stator angle V$\alpha$ and V$\beta$ respectively with the space vector modulation module 604 arranged to generate three phase voltage values for each submotor.

The ADC 607 in the space vector controller 610 converts the current sensor readings of the current flow in the respective coil windings into the digital domain to allow the processor implementing the space vector controller functionality to perform a Clarke transformation from the three phase current readings Iu, Iv, Iw to two phase current readings Iα, Iβ.

Preferably the processor 420 in each control device 400 includes three ADCs 607 for allowing parallel analogue to digital conversion of any three given measurements.

For example, a preferred order of ADC sampling is illustrated in Table 1 where each ADC conversion takes approximately 1 μsec.

TABLE 1

| Time offset | ADC 1 | ADC 2 | ADC 3 |
|---|---|---|---|
| 0 | First commutation hall sensor | Second commutation hall sensor | |
| 1 μsec | Current U | Current V | Current W |

The sampled currents Ia, Ib, and Ic in FIG. 6 correspond to currents U, V and W respectively.

Figure 7:
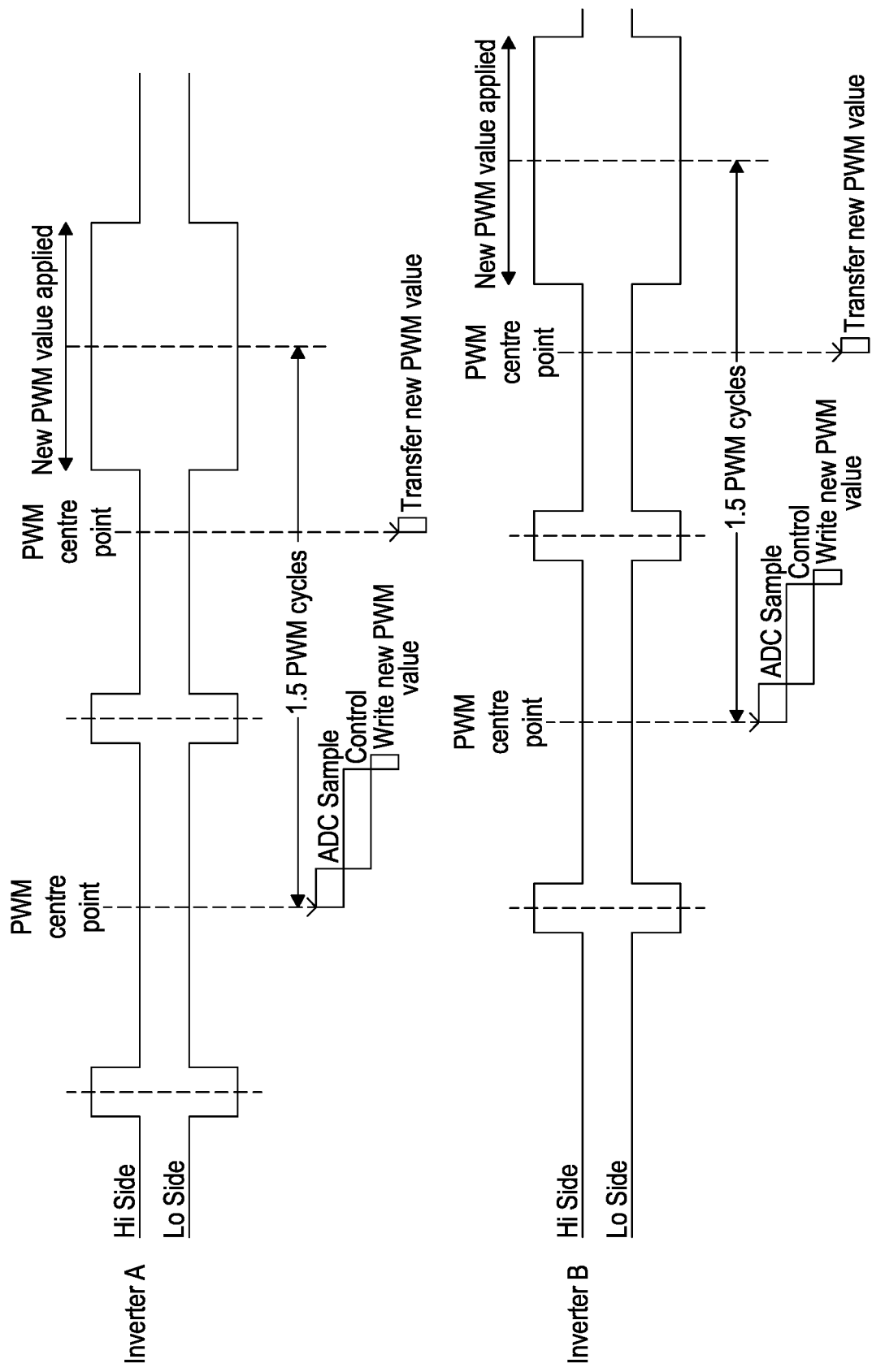
FIG. 7 illustrates PWM voltage control and ADC sampling according to an embodiment of the present invention.

To minimise any disturbance on the current sensor readings caused by the fast switching edges of the IGBTs, the timing of the ADC sampling is performed at approximately the centre of the PWM periods, as illustrated in FIG. 7.

However, due to the PWM timing for each inverter being shifted/staggered relative to each other, where in the present embodiment the PWM switching sequence for one sub motor is staggered by half the PWM period, for each control device the ADC sampling for one sub motor is commenced a half PWM period (i.e. 31.25 μsec) after the ADC sampling has commenced on the other sub motor that are coupled to the control device, as illustrated in FIG. 7.

On the basis that the current value Iw=−Iu−Iv, typically for each sub motor only two current values are required for performing space vector control. However, to ensure that the measured current readings are correct typically all three current phases are measured/sampled to allow a plausibility check to be performed on the current sensor readings, where $$Iu+Iv+Iw=0$$

If the sum of the measured values is not substantially zero this is indicative that at least one of the current sensor readings is incorrect. A preferred embodiment for determining which of the current sensor readings is incorrect will now be described.

If a determination is made that for a first sub motor at least one of the current values is incorrect (i.e. a current plausibility check is unsuccessful), following a successful current plausibility check with the second sub motor controlled by the same control device the Vq and Vd values that are used by the second sub motor (i.e. the sub motor that has successfully passed the current plausibility check, where the sum of the measured current values is substantially zero) are used to generate the PWM values for the first sub motor, where the respective PWM switching sequence for the first sub motor and the second sub motor are maintained (i.e. the second PWM switching sequence is staggered relative to the first PWM switching sequence).

On the basis that the Vq and Vd values used for generating current flow in the second sub motor should create substantially the same current flow in the first sub motor, the currents generated by the first sub motor and the second sub motor can then be compared to identify which one of the current sensors used for measuring current flow in the coil windings of the first sub motor is faulty.

However, to allow the measured current values for the first sub motor and the second sub motor to be accurately compared it is desirable to correct for time differences associated with measurements of the respective current values, where as the ADC sampling point for one sub motor is commenced a half PWM period after the ADC sampling has commenced on the other sub motor, the determined current values for the other sub motor have to be corrected for the time that has elapsed between the two readings before the two sets of current readings can be compared.

Equally the current values for the sub motor where the ADC sampling point is commenced a half PWM period after the other sub motor may be corrected relative to the other sub motor ADC sample points for the time difference between the ADC sampling points, or the sub motor current values where the ACD sampling point is commenced a half PWM period before the other sub motor may be corrected relative to the other sub motor.

Any mechanism may be used for correcting the measured current values for the time difference between the first PWM switching sequence and the second PWM switching sequence, for example if the current values are sinusoidal in nature and the position of the rotor is known, a corrected current value may be extrapolated by determining a current value based on the sinusoidal nature of the current and the time difference between the two current ADC sampling points.

However, in a preferred embodiment corrected current values are determined by performing a Clarke Park transformation on the current values to generate an Id and Iq current value, where:

$$Id=f(\theta,Iu,Iv); \text{ and}$$

$$Iq=f(\theta,Iu,Iv)$$

where the Clarke and Park transformation equations are well known to a person skilled in the art.

Using the Id and Iq current values it is then possible to correct for the phase change resulting from the time difference between the first PWM switching sequence and the second PWM switching sequence. For example, $$I_{u1}(t+\Delta t)=f(\theta(t+\Delta t),Id,Iq$$

where Δt corresponds to the time difference between ADC current sampling points between the two sub motors. Therefore, in the above example, the current value $I_u$ is corrected for the change in θ resulting from the time difference between the sampling points for $I_{u1}$ in the first sub motor and $I_{u2}$ in the second sub motor.

Corresponding calculations are also performed for currents Iv and Iw.

Once the corrected current values for each phase have been determined, the correct current values are compared with the determined current values for the other sub motor.

If one of the current values in the sub motor that failed the plausibility check has a different value to the corresponding current in the sub motor that pass the plausibility check, as the same Vq and Vd values are used for generating current flow in the respective sub motors, the current sensor that generates a different value to the corresponding current in the sub motor that pass the plausibility check can be regarded as faulty.

For the sub motor that failed the current plausibility check, having identified which current sensor is faulty the other two current values can be used for performing space vector modulation calculations. For example, if the current sensor used for measuring Iw is identified as being faulty, the sensor reading values for this current can be replaced by −Iu−Iv, as described above.

The invention claimed is:

1. A control device for an electric motor having a first set of coil windings arranged to form a first sub motor and a second set of coil windings arranged to form a second sub motor, wherein current flow in the first set of coil windings is controlled using a first pulse width modulation ("PWM") having a first switching sequence and current flow in the second set of coil windings is controlled using a second PWM having a second switching sequence, the control device comprising:
   a current sensor to measure the current flow in each of the first set of coil windings, and
   an electronic processor to, upon determining that the sum of the current flow in the first set of coil windings is substantially non zero, derive the first PWM values from a set of voltage values used to generate the second PWM.

2. A control device according to claim 1, wherein the second switching sequence is staggered relative to the first PWM switching sequence.

3. A control device according to claim 1, wherein, upon determining that the sum of the current flow in the first set of coil windings is substantially non zero, the first PWM values are derived from a quadrature axis voltage value and a direct axis voltage axis value used to generate the second PWM.

4. A control device according to claim 1, further comprising:
   means for measuring the current flow in each of the second set of coil windings, and
   means for correcting the measured current flow values in each of the second set of coil windings for the time difference between the first PWM switching sequence and the second PWM switching sequence and comparing the corrected current flow values for each of the second set of coil windings with measured current flow value for a respective coil winding of the first set of coil windings,
   wherein the current flow in the first set of coil windings is derived using the first PWM values derived from the voltage values used to generate the second PWM.

5. A control device according to claim 4, wherein, upon determining that the corrected current flow values for one of the second set of coil windings is different to the measured current flow value for the respective coil winding of the first set of coil windings, the measured current flow value for the respective coil winding of the first set of coil windings that is different is not used for determining current flow in the first set of coil windings.

6. A control device according to claim 4, wherein, upon determining that the corrected current flow values for one of the second set of coil windings is different to the measured current flow value for the respective coil winding of the first set of coil windings, the measured current flow value for the respective coil winding of the first set of coil windings that is different is replaced with the negative sum of the other current values for the remaining coil windings in the first set of coil windings.

7. An electric motor system, comprising:
   an electric motor having:
      a first set of coil windings arranged to form a first sub motor, and
      a second set of coil windings arranged to form a second sub motor,
      wherein current flow in the first set of coil windings is controlled using a first pulse width modulation, PWM, having a first switching sequence and current flow in the second set of coil windings is controlled using a second PWM having a second switching sequence; and
   a control device including to measure the current flow in each of the first set of coil windings, upon determining that the sum of the current flow in the first set of coil windings is substantially non zero, the first PWM values are derived from a set of voltage values used to generate the second PWM.

8. An electric motor system according to claim 7, wherein the second PWM switching sequence is staggered relative to the first PWM switching sequence.

9. An electric motor system according to claim 8, wherein the amount the second PWM switching sequence is staggered relative to the first PWM switching sequence is dependent upon the number of sub motors formed within the electric motor.

10. An electric motor system according to claim 7, wherein the first set of coil windings and the second set of coil windings each include three coil windings.

11. An electric motor system according to claim 10, wherein the current flow in the first set of coil windings forms substantially three sine waves shifted substantially 120 degrees with respect to each other.

12. An electric motor system according to claim 10, wherein the current flow in the second set of coil windings forms substantially three sine waves shifted substantially 120 degrees with respect to each other.

13. An electric motor system according to claim 8, wherein the second PWM switching sequence is staggered relative to the first PWM switching sequence by a predetermined time period.

14. An electric motor system according to claim 13, wherein the predetermined time period is based on the number of sub motors formed within the electric motor.

15. A method for an electric motor having a first set of coil windings arranged to form a first sub motor and a second set of coil windings arranged to form a second sub motor, wherein current flow in the first set of coil windings is controlled using a first pulse width modulation ("PWM") having a first switching sequence and current flow in the second set of coil windings is controlled using a second PWM having a second switching sequence, the method comprising:
   measuring the current flow in each of the first set of coil windings, wherein, upon determining that the sum of the current flow in the first set of coil windings is substantially non zero, the first PWM values are derived from a quadrature axis voltage value and a direct axis voltage axis value used to generate the second PWM.

16. A method according to claim 15, wherein the second PWM switching sequence is staggered relative to the first PWM switching sequence.

17. A method according to claim 15, wherein, upon determining that the sum of the current flow in the first set of coil windings is substantially non zero deriving the first PWM values from a quadrature axis voltage value and a direct axis voltage axis value used to generate the second PWM.

18. A method according to claim 15, further comprising:
   measuring the current flow in each of the second set of coil windings,
   correcting the measured current flow values in each of the second set of coil windings for the time difference between the first PWM switching sequence and the second PWM switching sequence, and comparing the corrected current flow values for each of the second set of coil windings with measured current flow value for a respective coil winding of the first set of coil windings, wherein the current flow in the first set of coil windings is derived using the first PWM values from voltage values used to generate the second PWM.

* * * * *